United States Patent
Krishnan et al.

(10) Patent No.: US 10,516,813 B2
(45) Date of Patent: Dec. 24, 2019

(54) SENSOR ASSEMBLY

(71) Applicant: Ford Global Technologies, LLC, Dearborn, MI (US)

(72) Inventors: Venkatesh Krishnan, Canton, MI (US); Rashaun Phinisee, Ypsilanti, MI (US); Andre Sykula, Sterling Heights, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 9 days.

(21) Appl. No.: 15/682,979

(22) Filed: Aug. 22, 2017

(65) Prior Publication Data

US 2019/0068845 A1  Feb. 28, 2019

(51) Int. Cl.
| | |
|---|---|
| *H04N 5/225* | (2006.01) |
| *B08B 3/02* | (2006.01) |
| *B08B 3/04* | (2006.01) |
| *B60Q 1/32* | (2006.01) |
| *B60S 1/56* | (2006.01) |
| *B60Q 1/00* | (2006.01) |
| *B62D 35/00* | (2006.01) |

(Continued)

(52) U.S. Cl.
CPC ............. *H04N 5/2252* (2013.01); *B08B 3/02* (2013.01); *B08B 3/04* (2013.01); *B60Q 1/0023* (2013.01); *B60Q 1/32* (2013.01); *B60S 1/56* (2013.01); *B62D 35/008* (2013.01); *H04N 5/2256* (2013.01); *B05B 11/0059* (2013.01); *B08B 2203/0223* (2013.01); *B08B 2203/0252* (2013.01); *B60S 1/52* (2013.01); *B60Y 2400/3015* (2013.01); *B60Y 2410/10* (2013.01)

(58) Field of Classification Search
CPC ...... H04N 5/2252; H04N 5/2256; B08B 3/02; B08B 3/04; B08B 2203/0223; B08B 2203/0252; B60Q 1/0023; B60Q 1/32; B60S 1/52; B60S 1/56; B62D 35/008; B05B 11/0059; B60Y 2400/3015; B60Y 2410/10

See application file for complete search history.

(56) References Cited

U.S. PATENT DOCUMENTS 6,959,994 B2    11/2005  Fujikawa et al.
2012/0133768 A1*  5/2012  Stephan .................... B60R 1/00
                                                    348/148

(Continued)

FOREIGN PATENT DOCUMENTS

DE        102015117612 A1    4/2017

OTHER PUBLICATIONS

Cadie Thompson, "BMW designed a car without any mirrors", Apr. 29, 2017, http://www.businessinsider.com/heres-what-a-mirrorless-car-looks-like-2017-4.

*Primary Examiner* — Twyler L Haskins
*Assistant Examiner* — Fayez Bhuiyan
(74) *Attorney, Agent, or Firm* — Frank A. MacKenzie; Bejin Bieneman PLC

(57) ABSTRACT

A sensor assembly includes a housing having an airfoil shape and including a pressure surface and a suction surface, a sensor attached to the housing and disposed on the suction surface, and a nozzle attached to the housing and directed toward the sensor. A vehicle may include an exterior panel, and the sensor assembly may be attached to the exterior panel.

20 Claims, 3 Drawing Sheets

(51) Int. Cl.
*B05B 11/00* (2006.01)
*B60S 1/52* (2006.01)

(56) References Cited

U.S. PATENT DOCUMENTS

| | | |
|---|---|---|
| 2012/0212845 A1* | 8/2012 | Wulff .................... B60R 1/0605 |
| | | 359/871 |
| 2013/0128601 A1 | 5/2013 | Kim et al. |
| 2014/0104426 A1 | 4/2014 | Boegel et al. |
| 2014/0218521 A1* | 8/2014 | Tanaka .................... B60Q 1/24 |
| | | 348/148 |
| 2017/0080863 A1 | 3/2017 | Henion et al. |
| 2018/0174327 A1* | 6/2018 | Singh ........................ G06T 7/80 |

* cited by examiner

SENSOR ASSEMBLY

BACKGROUND

Vehicles, such as autonomous vehicles, typically include a variety of sensors. Some sensors detect internal states of the vehicle, for example, wheel speed, wheel orientation, and engine and transmission variables. Some sensors detect the location and/or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras.

DETAILED DESCRIPTION

A sensor assembly includes a housing having an airfoil shape and including a pressure surface and a suction surface, a sensor attached to the housing and disposed on the suction surface, and a nozzle attached to the housing and directed toward the sensor.

The housing may be attachable to a vehicle. The suction surface may face down when the housing is attached to the vehicle.

The sensor assembly may include a lamp attached to the housing. The lamp may be disposed on the suction surface of the housing. The lamp may be a puddle lamp. The housing may include an attachment end. The lamp may be closer to the attachment end than the sensor. The attachment end may be attachable to a vehicle, and the lamp may be farther down than the sensor when the attachment end is attached to the vehicle. The lamp may be directed straighter downward than the sensor when the attachment end is attached to the vehicle.

The sensor may include a lens, and the nozzle may be positioned to spray liquid over an entirety of the lens. The housing may include an attachment end, and the nozzle may be farther from the attachment end than the sensor.

The sensor may be a camera. The camera may include a fisheye lens.

The suction surface may include a protruding portion on which the sensor is disposed.

The sensor may protrude from the suction surface.

A vehicle includes an exterior panel, a housing elongated from the exterior panel, a sensor attached to the housing, and a nozzle attached to the housing. The housing has an airfoil shape and includes a pressure surface and a suction surface. The sensor is disposed on the suction surface, and the nozzle is directed toward the sensor.

The vehicle may include a door including the exterior panel.

The suction surface may face down, and the pressure surface may face up. The nozzle may be farther from the exterior panel than the sensor.

The sensor assembly described herein facilitates cleaning of a sensor and may thus allow the sensor, after being completely or partly soiled or covered with dirt, debris, dust, water, ice, condensation, etc., to continue to provide useful data and/or to more accurately detect an external environment through which a vehicle moves. The sensor assembly takes advantage of airflow from a vehicle having the sensor assembly traveling and of gravity, reducing the need to use liquid and/or compressed gas for cleaning the sensor. Moreover, the shape of a housing of the sensor assembly creates a low-pressure zone across the sensor, helping to remove water, dust, debris, etc. Furthermore, the placement of the sensor assembly may obviate the need for the vehicle to have a side-view mirror, reducing cost and parts for the vehicle. The design of the sensor assembly provides easy assembly and access for maintenance.

Figure 1:
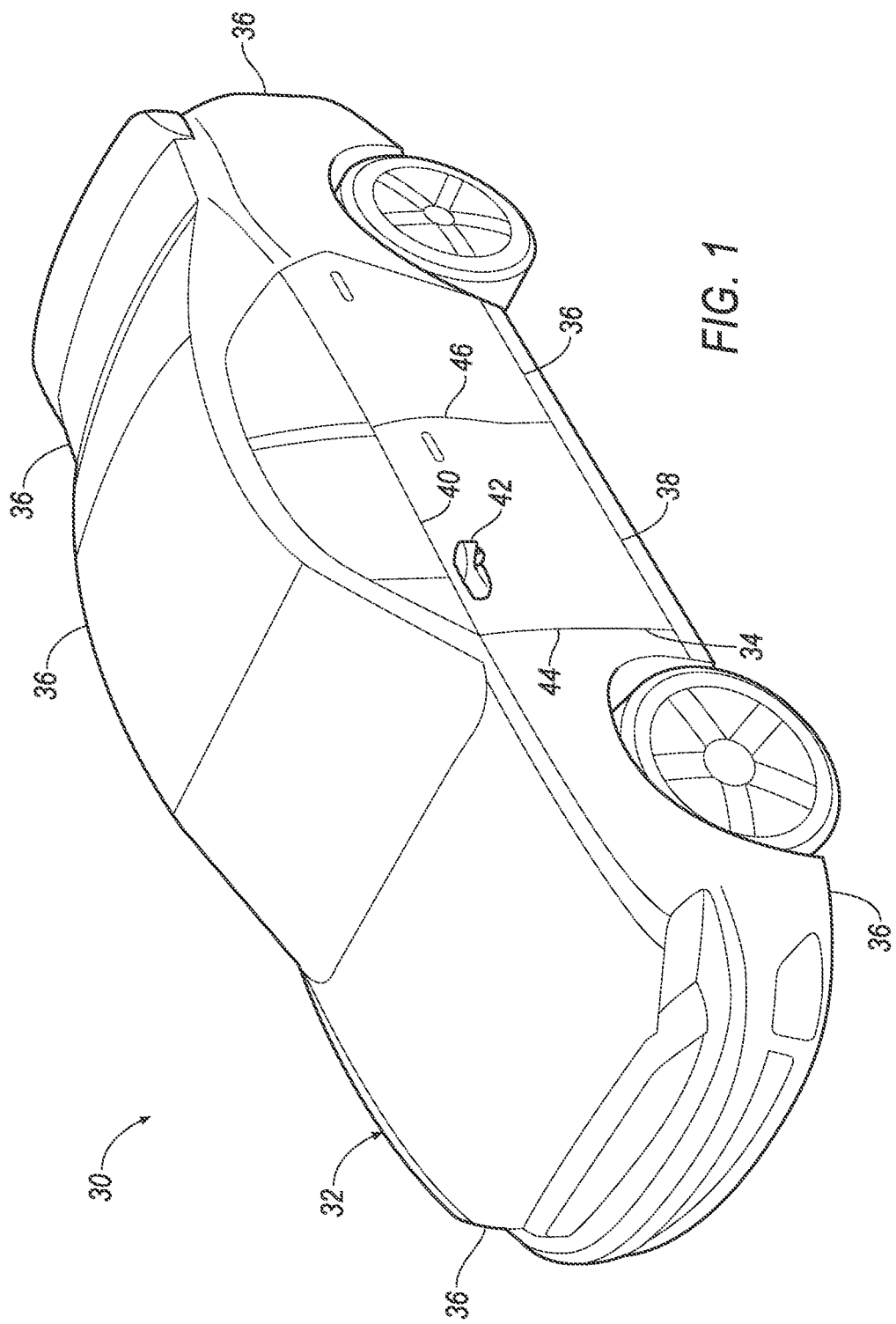
FIG. 1 is a perspective view of a vehicle.

With reference to FIG. 1, a vehicle 30 may be an autonomous vehicle. A computer can be configured to operate the vehicle 30 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering; semi-autonomous operation means the computer controls one or two of the propulsion, brake system, and steering and a human driver controls the remainder of these; and nonautonomous operation means the human driver controls each of the propulsion, brake system, and steering.

The vehicle 30 includes a body 32. The vehicle 30 may be of a unibody construction, in which a frame and the body 32 of the vehicle 30 are a single component. The vehicle 30 may, alternatively, be of a body-on-frame construction, in which the frame supports the body 32 that is a separate component from the frame. The frame and the body 32 may be formed of any suitable material, for example, steel, aluminum, etc.

Figure 2:
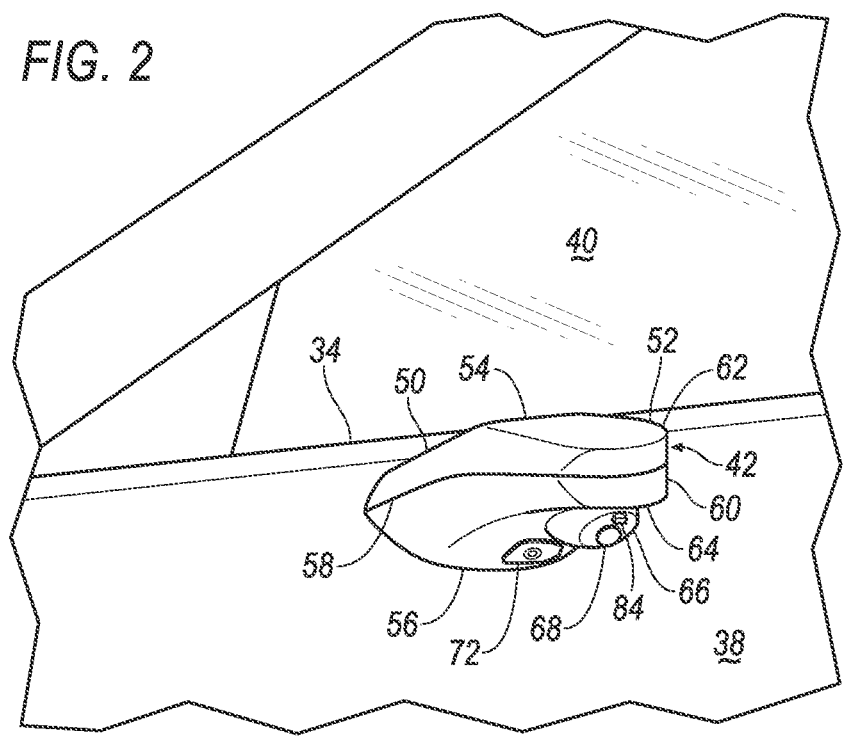
FIG. 2 is a perspective view of a portion of the vehicle including a sensor assembly.

With reference to FIGS. 1 and 2, the body 32 includes a plurality of exterior panels 34, 36. The exterior panels 34, 36 are disposed on an outside of the vehicle 30 and may have a finished outer surface. At least one of the exterior panels 34, 36, hereinafter a first exterior panel 34, is included in a door 38. The door 38 may be a front door. The door 38 may include a window 40.

A housing 42 is attachable to the vehicle 30, specifically, to the first exterior panel 34 of the door 38. The housing 42 may be positioned closer to the window 40 than to a bottom of the door 38 or vehicle 30, and the housing 42 may be positioned closer to a front edge 44 of the door 38 than to a back edge 46 of the door 38. The front edge 44 of the door 38 is positioned at the front of the door 38 relative to the vehicle 30, and the back edge 46 of the door 38 is positioned at the back of the door 38 relative to the vehicle 30. The housing 42 may be positioned on the door 38 in lieu of the vehicle 30 including a side-view mirror. The housing 42 is elongated from the first exterior panel 34.

Figure 3:
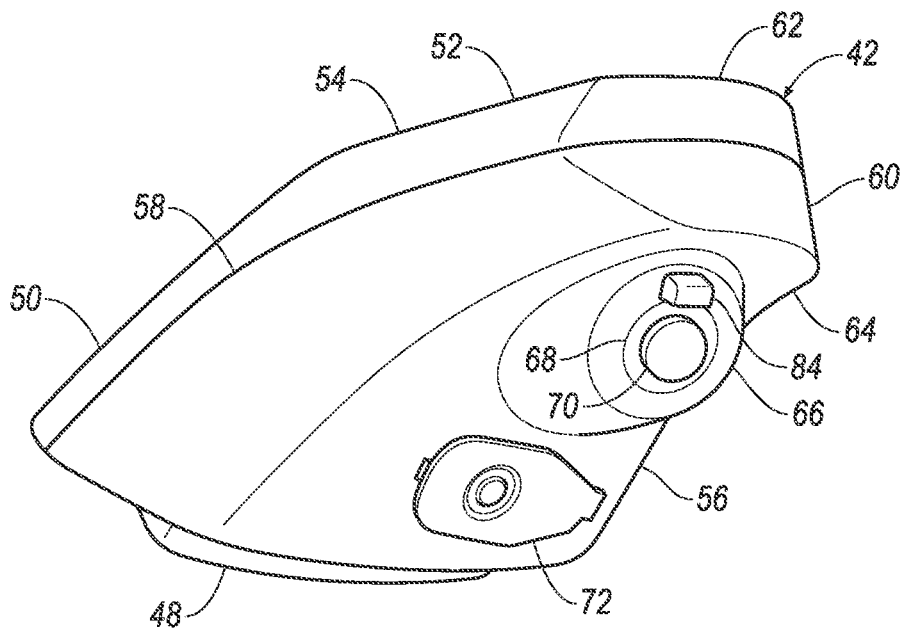
FIG. 3 is a perspective view of the sensor assembly.

With reference to FIG. 3, the housing 42 is attachable to the door 38 first exterior panel 34 (not seen in FIG. 3) via an attachment end 48. The housing 42 includes the attachment end 48, and the attachment end 48 is attachable to the vehicle 30, e.g., to the exterior panel 34. The attachment end 48 may be attached to the first exterior panel 34 via a press fit, via adhesive, via tabs, via fasteners, etc.

The housing 42 is elongated from the first exterior panel 34, specifically, from the attachment end 48 attached to the first exterior panel 34. The housing 42 may include an angled section 50 elongated up and outboard relative to the vehicle 30 from the attachment end 48, and the housing 42 may include a level section 52 elongated from the angled section 50 outboard relative to the vehicle 30. The housing 42 is thus elongated along a kinked shape, i.e., a shape with two elongated portions connected at an obtuse angle.

Figure 5:
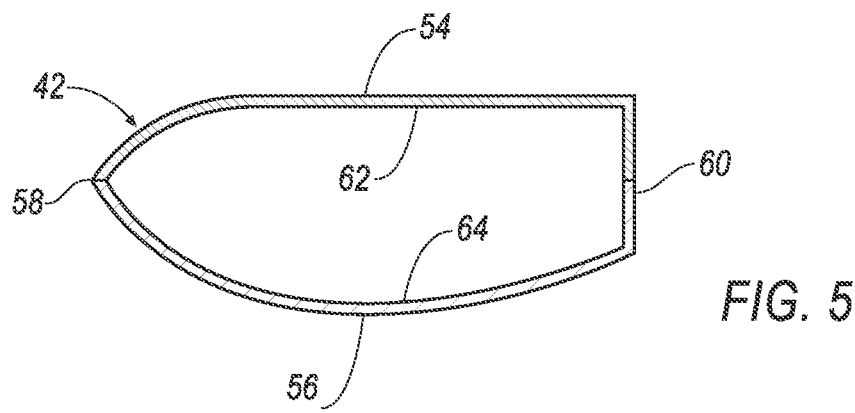
FIG. 5 is a cross-sectional view of a housing of the sensor assembly along line 5-5 in FIG. 4.

With reference to FIGS. 3 and 5, the housing 42 has an airfoil shape and includes a pressure surface 54 and a suction surface 56. For the purposes of this disclosure, an airfoil shape is a shape that, when moved in a direction of travel, produces an aerodynamic force perpendicular to the direction of travel. The direction of travel in the present context is generally a forward direction of the vehicle 30. For the purposes of this disclosure, the pressure surface 54 is a side of an airfoil shape experiencing higher pressure, and the suction surface 56 is a side of an airfoil shape experiencing lower pressure. The pressure surface 54 and the suction surface 56 extend from a leading edge 58 to a trailing edge 60 of the housing 42. The leading edge 58 is a forward edge relative to the vehicle 30, and the trailing edge 60 is a rear edge relative to the vehicle 30. When the vehicle 30 travels forward, air moves relative to the housing 42 from the leading edge 58 to the trailing edge 60. A length from any point of the leading edge 58, in a direction opposite the direction of travel to the trailing edge 60, is longer for the suction surface 56 than for the pressure surface 54. When the vehicle 30 moves, airflow opposite the direction of travel is faster across the suction surface 56 than across the pressure surface 54, and air pressure is lower along the suction surface 56 than along the pressure surface 54. Air pressure may be lower along the suction surface 56 than along, e.g., the first exterior panel 34. The suction surface 56 may face down relative to the vehicle 30, and the pressure surface 54 may face up relative to the vehicle 30.

The housing 42 may include a top piece 62 and a bottom piece 64. The top piece 62 and bottom piece 64 may be fastened together with, e.g., tamper-proof fasteners requiring special tools. The top piece 62 and the bottom piece 64 may be connected at the leading edge 58 and at the trailing edge 60. The top piece 62 and the bottom piece 64 may be any suitably durable and rigid material, e.g., acrylonitrile butadiene styrene (ABS) plastic. The top piece 62 and the bottom piece 64 may be formed by injection molding. The pressure surface 54 may be on the outside of the top piece 62, and the suction surface 56 may on the outside of the bottom piece 64. The pressure surface 54 on the top piece 62 and the suction surface 56 on the bottom piece 64 may be finished to match an outside of the exterior panels 34, 36, e.g., to match exterior paint of the vehicle 30.

Figure 4:
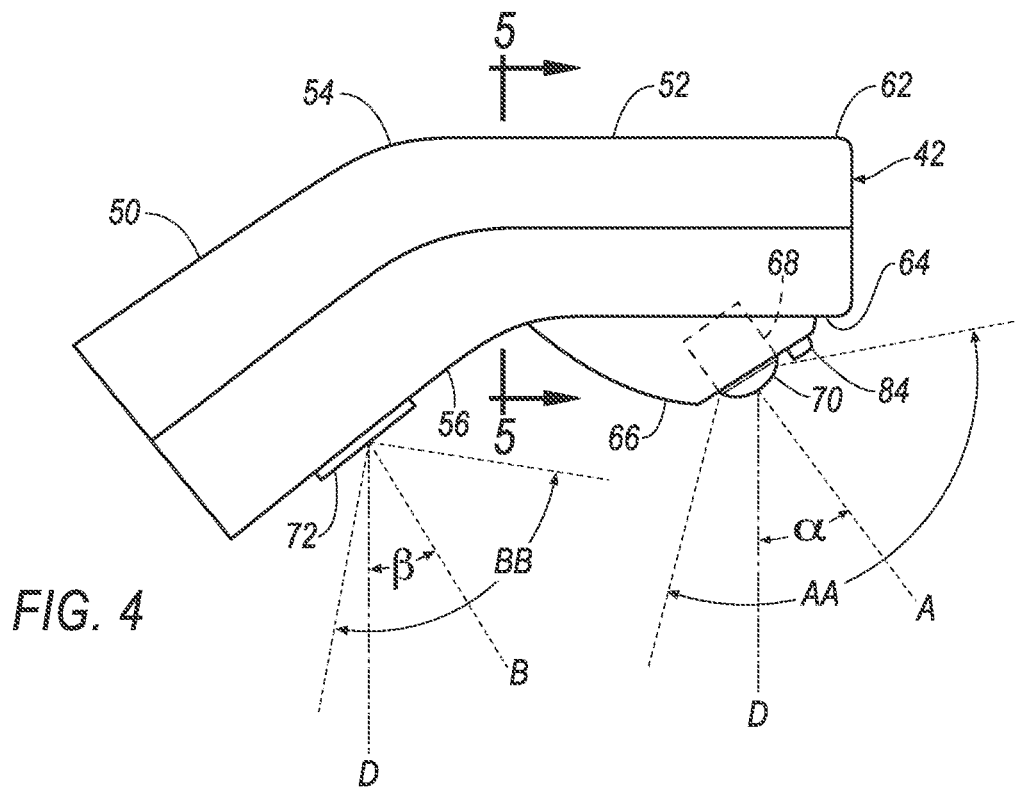
FIG. 4 is a front view of the sensor assembly.

With reference to FIGS. 2-4, the suction surface 56 may include a protruding portion 66. The protruding portion 66 extends outward from the housing 42 away from the rest of the suction surface 56 bordering the protruding portion 66. A sensor 68 may be attached to the housing 42 and disposed on the suction surface 56. The sensor 68 may thus protrude from the suction surface 56. The protruding portion 66 and the sensor 68 may be disposed on the level section 52 of the bottom piece 64 of the housing 42.

With reference to FIG. 4, the sensor 68 may be oriented at least partially downward relative to the vehicle 30. The sensor 68 may be pointed in a direction A; in other words, the sensor 68 may have a field of view AA, in which the direction A is at a center. The direction A may be at an angle α from a direction D straight downward, and the angle α may be an acute angle. The field of view AA may include the direction D. The sensor 68 may be oriented at least partially outboard relative to the vehicle 30, i.e., away from the vehicle 30. The direction A may point at the angle α from the direction D straight downward away from the vehicle 30.

With reference to FIGS. 2-4, the sensor 68 may detect the external world. For example, the sensor 68 may be a radar sensor, scanning laser range finder, light detection and ranging (LIDAR) device, or image processing sensor. For specific example, the sensor 68 may be a camera. The sensor 68 may include a lens 70. Specifically, if the sensor 68 is a camera, the lens 70 may be a fisheye lens. The lens 70 may have a hydrophobic coating. The sensor 68 may be in communication with the computer and provide data to computer for the computer to autonomously or semi-autonomously operate the vehicle 30.

A lamp 72 may be attached to the housing 42. The lamp 72 may be disposed on the suction surface 56 of the housing 42. The lamp 72 may be closer to the attachment end 48 and to the first exterior panel 34 than the sensor 68, and the lamp 72 may be farther down than the sensor 68 relative to the vehicle 30 when the attachment end 48 is attached to the vehicle 30. The lamp 72 may be disposed on the angled section 50 of the bottom piece 64 of the housing 42.

With reference to FIG. 4, the lamp 72 may be oriented at least partially downward relative to the vehicle 30. The lamp 72 may be pointed in a direction B; in other words, the lamp 72 may have a beam BB, in which the direction B is at a center. The direction B may be at an angle β from the direction D straight downward, and the angle β may be an acute angle. The beam BB may include the direction D. The lamp 72 may be oriented at least partially outboard relative to the vehicle 30, i.e., away from the vehicle 30. The direction B may point at the angle β from the direction D straight downward away from the vehicle 30. The lamp 72 may be directed straighter downward than the sensor 68 when the attachment end 48 is attached to the vehicle 30; in other words, the angle β may be smaller than the angle α.

With reference to FIGS. 2-4, the lamp 72 may be any lighting system suitable for illuminating a roadway beside the vehicle 30, including tungsten, halogen, high-intensity discharge (HID) such as xenon, light-emitting diode (LED), laser, etc. For example, the lamp 72 may be a puddle lamp, i.e., a lamp oriented to illuminate the ground beside the vehicle 30.

Figure 6:
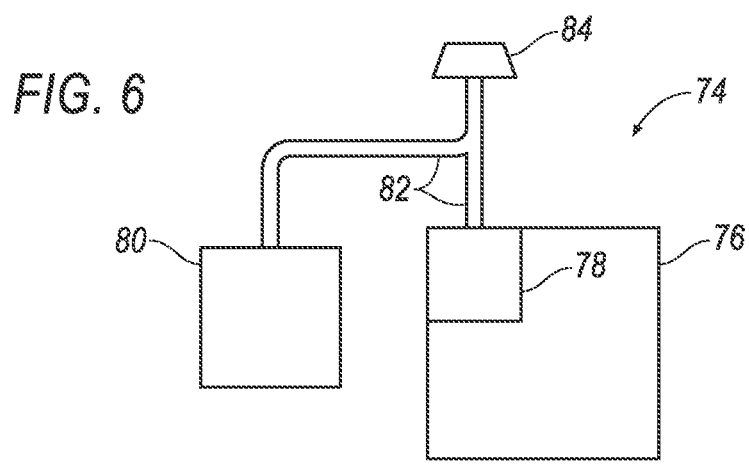
FIG. 6 is a diagram of a cleaning system for the sensor assembly.

With reference to FIG. 6, a cleaning system 74 of the vehicle 30 includes a reservoir 76, a pump 78, a compressor 80, supply lines 82, and one or more nozzles 84. The cleaning system 74 distributes washer fluid stored in the reservoir 76 and compressed air from the compressor 80 to the nozzle 84. "Washer fluid" refers to any liquid stored in the reservoir 76 for cleaning. The washer fluid may include solvents, detergents, diluents such as water, etc. The reservoir 76, the pump 78, and the nozzle 84 are fluidly connected to each other (i.e., fluid can flow from one to the other) in sequence. The compressor 80 and the nozzle 84 are fluidly connected to each other.

The reservoir 76 may be a tank fillable with liquid, e.g., washer fluid for cleaning. The reservoir 76 may be disposed in a front of the vehicle 30, specifically, in an engine compartment forward of a passenger cabin. The reservoir 76 may store the washer fluid only for supplying the nozzle 84 or also for other purposes, such as supply to a windshield.

The pump 78 may force the washer fluid through the supply lines 82 to the nozzle 84 with sufficient pressure that the washer fluid sprays from the nozzle 84. The pump 78 is fluidly connected to the reservoir 76. The pump 78 may be attached to or disposed in the reservoir 76.

The compressor 80 increases the pressure of a gas by reducing a volume of the gas or by forcing additional gas into a constant volume. The compressor 80 may be any suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The supply lines 82 extend from the compressor 80 to the nozzle 84 and from the pump 78 to the nozzle 84. The supply lines 82 may be, e.g., flexible tubes.

With reference to FIGS. 2-4 and 6, the cleaning system 74 includes one or more nozzles 84 and is depicted in the Figures as including one nozzle 84. The nozzle 84 is attached to the housing 42 and directed toward the sensor 68. The nozzle 84 is positioned to spray liquid or output gas over or onto substantially an entirety of the lens 70 of the sensor 68. The nozzle 84 may be positioned farther from the first exterior panel 34 and attachment end 48 than the sensor 68, and the nozzle 84 may be directed inboard relative to the vehicle 30. The nozzle 84 may be positioned on the level section 52 of the bottom piece 64 of the housing 42, specifically, on the protruding portion 66. The nozzle 84 may be positioned on the suction surface 56.

The disclosure has been described in an illustrative manner, and it is to be understood that the terminology which has been used is intended to be in the nature of words of description rather than of limitation. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. A sensor assembly comprising:
   a housing having an airfoil shape, wherein an airfoil shape is defined as having an exterior pressure surface and an exterior suction surface and when moving in a direction of travel producing a force perpendicular to the direction of travel resulting from comparatively lower pressure experienced by the exterior suction surface than experienced by the exterior pressure surface, wherein the housing includes an attachment end, and both surfaces are elongated together away from the attachment end;
   a sensor attached to the housing, disposed on the exterior suction surface, and spaced from the exterior pressure surface; and
   a nozzle attached to the housing and directed toward the sensor.

2. The sensor assembly of claim 1, wherein the housing is attachable to a vehicle at the attachment end.

3. The sensor assembly of claim 2, wherein the exterior suction surface faces down when the housing is attached to the vehicle.

4. The sensor assembly of claim 1, further comprising a lamp attached to the housing.

5. The sensor assembly of claim 4, wherein the lamp is disposed on the exterior suction surface of the housing.

6. The sensor assembly of claim 5, wherein the lamp is a puddle lamp.

7. The sensor assembly of claim 1, wherein the lamp is closer to the attachment end than the sensor.

8. The sensor assembly of claim 7, wherein the attachment end is attachable to a vehicle, and the lamp is farther down than the sensor when the attachment end is attached to the vehicle.

9. The sensor assembly of claim 8, wherein the lamp is directed straighter downward than the sensor when the attachment end is attached to the vehicle.

10. The sensor assembly of claim 1, wherein the sensor includes a lens, and the nozzle is positioned to spray liquid over an entirety of the lens.

11. The sensor assembly of claim 10, wherein the nozzle is farther from the attachment end than the sensor.

12. The sensor assembly of claim 1, wherein the sensor is a camera.

13. The sensor assembly of claim 12, wherein the camera includes a fisheye lens.

14. The sensor assembly of claim 1, wherein the exterior suction surface includes a protruding portion on which the sensor is disposed.

15. A vehicle comprising:
    an exterior panel;
    a housing elongated from the exterior panel, the housing having an airfoil shape, wherein an airfoil shape is defined as having an exterior pressure surface and an exterior suction surface and when moving in a direction of travel producing a force perpendicular to the direction of travel resulting from comparatively lower pressure experienced by the exterior suction surface than experienced by the exterior pressure surface, both surfaces elongated together away from the exterior panel;
    a sensor attached to the housing and disposed on the exterior suction surface and spaced from the exterior pressure surface; and
    a nozzle attached to the housing and directed toward the sensor.

16. The vehicle of claim 15, further comprising a door including the exterior panel.

17. The vehicle of claim 15, wherein the exterior suction surface faces down, and the pressure surface faces up.

18. The vehicle of claim 17, wherein the nozzle is farther from the exterior panel than the sensor.

19. The vehicle of claim 15, wherein the exterior pressure surface and the exterior suction surface border each other along a leading edge defined by the airfoil shape and along a trailing edge defined by the airfoil shape.

20. The vehicle of claim 19, wherein a length from any point of the leading edge, in a direction opposite a direction of travel of the vehicle to the trailing edge, is longer for the exterior suction surface than for the exterior pressure surface.

* * * * *